US009990810B2

(12) United States Patent
Crist et al.

(10) Patent No.: US 9,990,810 B2
(45) Date of Patent: Jun. 5, 2018

(54) DECOY SENSOR SYSTEM FOR AUTOMATED TELLER MACHINES

(71) Applicant: Bank of America Corporation, Charlotte, NC (US)

(72) Inventors: Kristy M. Crist, Charlotte, NC (US); Terrelle Carswell, Charlotte, NC (US); Eric McConnell, Cornelius, NC (US); Rahul Puri, Charlotte, NC (US); Devin D. Rhodes, Lexington, KY (US); James D. Goodwin, Kansas City, MO (US)

(73) Assignee: Bank of America Corporation, Charlotte, NC (US)

( * ) Notice: Subject to any disclaimer, the term of this patent is extended or adjusted under 35 U.S.C. 154(b) by 350 days.

(21) Appl. No.: 15/002,238

(22) Filed: Jan. 20, 2016

(65) Prior Publication Data
US 2016/0140524 A1    May 19, 2016

Related U.S. Application Data (63) Continuation of application No. 13/890,458, filed on May 9, 2013, now Pat. No. 9,368,002.

(51) Int. Cl.
| | |
|---|---|
| *G07F 19/00* | (2006.01) |
| *G06Q 20/10* | (2012.01) |
| *G06Q 20/40* | (2012.01) |
| *G07D 11/00* | (2006.01) |

(52) U.S. Cl.
CPC ....... *G07F 19/209* (2013.01); *G06Q 20/1085* (2013.01); *G06Q 20/4016* (2013.01); *G07D 11/0021* (2013.01); *G07F 19/206* (2013.01); *G07F 19/207* (2013.01)

(58) Field of Classification Search
CPC .................................. G06Q 20/1085
USPC .......................................... 705/43
See application file for complete search history.

(56) References Cited

U.S. PATENT DOCUMENTS

| | | | | |
|---|---|---|---|---|
| 4,326,218 A | * | 4/1982 | Coutta | G07G 3/003 348/150 |
| 2011/0068169 A1 | * | 3/2011 | Ross | G06K 7/0008 235/379 |
| 2012/0038772 A1 | * | 2/2012 | Priesterjahn | G07F 19/20 348/150 |

* cited by examiner

*Primary Examiner* — Hao Fu
(74) *Attorney, Agent, or Firm* — Weiss & Arons LLP; Michael A. Springs, Esq.

(57) ABSTRACT

Apparatus and methods for a sensor system are provided. The system may be configured to detect a dispensing of cash from an automated teller machine ("ATM"). The system may be configured to orient one or more sensors to capture a first information stream that includes the dispensing of cash. The system may be configured to detect a retraction of cash by the ATM. The system may orient one or more sensors to capture a second information stream that includes the retraction. The system may be configured to determine an estimate of cash collected by an ATM customer. The estimate may be based on a comparison of the first information stream and the second information stream.

21 Claims, 9 Drawing Sheets

FRAUD RECORD

TRANSACTION HISTORY - 8APR13
SESSION ID: 123456

DATE: APRIL 8, 2013
TIME: 08:17:21
LOCATION: ATM1234
CUSTOMER ACCOUNT: 87654321
CUSTOMER NAME: JANE DOE

| DESCRIPTION | TRANSACTION ID | AMOUNT | TIME |
|---|---|---|---|
| W/D REQ. | 131415 | $200.00 | 8:15:26 |
| DISPENSE | 131416 | $200.00 | 8:16:00 |
| RETRACTION | 131417 | [$80.00] | 8:17:00 |

ESTIMATED AMOUNT WITHDRAWN: $120.00
FRAUD SCORE: 75%

CAPTURED SENSOR DATA:

SENSOR #1　　　　　SENSOR #2　　　　　SENSOR #3

FILE.ONE　　　　　FILE.TWO　　　　　FILE.THREE

DECOY SENSOR SYSTEM FOR AUTOMATED TELLER MACHINES

CROSS-REFERENCE TO RELATED APPLICATIONS

This application is a continuation of U.S. patent application Ser. No. 13/890,458, filed on May 9, 2013, which is hereby incorporated by reference in its entirety.

FIELD OF TECHNOLOGY

Aspects of the invention relate to reducing costs associated with automated teller machine ("ATM") mis-dispense claims.

BACKGROUND

ATMs provide banking customers the ability to access bank account information, deposit funds and withdraw cash. ATMs may often obviate the need for a banking customer to consult a human clerk. Additionally, ATMs may be located in a variety of diverse locations remote from banking centers. For example, ATMs may be placed on street corners, in convenience stores, supermarkets or sports arenas.

In a typical ATM transaction, the customer may submit a request for a withdrawal of an amount of cash. The ATM may determine whether the customer has a bank account balance corresponding to, at least, a value of the requested funds. If the customer has sufficient bank account balance, the ATM may dispense the requested amount of cash.

The ATM may present the requested amount of cash to the customer. If the customer does not collect all of the dispensed cash, the ATM may be configured to retract uncollected cash. The ATM may be configured to wait for an expiration of a "time out" period before retracting cash.

An ATM customer may not retrieve all, or a portion of, dispensed cash because of an ATM malfunction. For example, the customer may submit a request for $80.00 in twenty-dollar notes and the ATM may erroneously dispense the requested $40.00 in ten-dollar notes. As a further example, the ATM may not provide sufficient time for the customer to become aware that the cash has been dispensed. The ATM may retract cash before the customer has time to collect dispensed cash.

In response to a retraction of cash by the ATM, a customer may submit a mis-dispense claim. The customer may submit the mis-dispense claim to an operator of the ATM. The customer may submit the mis-dispense claim to an entity responsible for managing a bank account of the customer.

The customer may request a credit for uncollected cash retracted by the ATM. The customer may request that because cash was retracted by the ATM, the account of the customer should not be debited. The customer may allege that none or a portion of a requested amount of cash was collected by the customer.

A wide variety of ATM locations and lack of close supervision at an ATM increases a risk that a customer may submit an unwarranted mis-dispense claim. For example, the customer may intentionally collect only a portion of the dispensed cash. The customer may then submit a mis-dispense claim alleging not to have collected any of the dispensed cash. Unwarranted mis-dispense claim have become so prevalent that some ATM operators have disabled a cash retraction feature of ATMs.

It would be desirable to provide a solution that examines cash retracted by an ATM following an unsuccessful customer withdrawal. Examination of retracted cash may provide information useful in a processing of mis-dispense claims and fraud research. For example, the examination may provide details such as denomination, number of bills retracted and a transaction identifier associated with the retraction.

It would be desirable to provide a solution that examines customer interaction with an ATM. The customer interaction may include collection of dispensed cash. The customer interaction may include a deposit of tangible items into the ATM. The customer interaction may include tampering with one or more components of the ATM. Examination of customer interaction with the ATM may provide information useful in a processing of mis-dispense claims and fraud research.

Additionally, a requirement to replenish the cash supply of the ATM is a cost of operating an ATM or a network of ATMs. Typically, ATMs may be refilled between bi-weekly to per day. Some ATMs in busy locations must be refilled twice a day. ATM operators may be reluctant to stock ATMs with additional cash because until the cash is dispensed from the ATM the cash is idling, increasing an opportunity cost of the cash. Restricting the amount of cash that may be withdrawn by a customer may inconvenience and irritate the customer. Armored personnel and services are typically employed to deliver cash to an ATM, further increasing the cost of replenishing the cash supply of an ATM.

An examination of cash dispensed or retracted by an ATM may indicate that a cash inventory of the ATM is not being efficiently utilized. Obtaining accurate information relating to cash dispensing or retracting may allow an ATM operator to better manage a cash inventory of an ATM or network of ATMs.

For example, an ability to examine cash prior to dispensing the cash may verify that genuine notes of the correct denomination are being dispensed from the ATM. The examination may reduce a cost of dispensing counterfeit notes, non-currency items or incorrect denominations that may have been erroneously loaded into the ATM. Detection of an erroneous loading of cash into the ATM may identify a human error or a process breakdown related to cash inventory.

Therefore, it would be desirable to obtain detail associated with cash dispensed or retracted from an ATM. It would be desirable to obtain transaction detail associated with cash dispensed or retracted from an ATM. The transaction detail may supply in formation used in managing cash supplied to an ATM.

Therefore, it would be desirable to provide apparatus and methods for detection of a partial retrieval of dispensed currency at an automated teller machine.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Apparatus and methods for detection of a partial retrieval of dispensed currency at an automated teller machine ("ATM") are provided. Apparatus and methods may be deployed at any suitable self-service kiosk ("SSK") that dispenses tangible items. Apparatus and methods may be applied to cash dispensing equipment including ATMs, currency recyclers and self-checkout machines located at retail merchants. Apparatus and methods may be applicable dispensing of non-cash items—i.e., airport kiosks, self-serve movie theater kiosks—and any suitable self-service kiosk that dispenses or retracts items.

Methods may be performed by an apparatus. The apparatus may include a non-transitory computer readable medium. The non-transitory computer readable medium may include computer readable program code embodied therein. The apparatus may include a processor. The processor may be configured to execute the computer readable program code.

Apparatus for reducing fraud associated with a partial collection of cash from an ATM are provided. Apparatus may detect that an amount of cash retracted by the ATM is less than the amount of cash dispensed by the ATM.

The apparatus may include a first sensor. The first sensor may be configured to capture first data. The first sensor may be oriented toward a dispenser of the ATM. The first sensor may be focused on the dispenser of an ATM. The first sensor may record one or more actions performed by an ATM. For example, the first sensor may record a dispensing of cash from an ATM dispenser. The first sensor may record a collection of cash from the dispenser.

Illustrative actions may be performed by an ATM are show below in Table 1.

TABLE 1

| Illustrative actions performed by an ATM |
| --- |
| Illustrative Actions Performed by an ATM |
| Authenticate customer |
| Access customer account information |
| Dispense cash |
| Receive deposit from a customer |
| Validate deposit |
| Retract cash |
| Print receipt |
| Validate dispensed cash |
| Validate retracted cash |
| Transfer retracted cash to purge-bin |
| Weigh cash |

The first sensor may record an interaction between an ATM customer and an ATM. The interaction may involve any suitable ATM component. The first sensor may be an image capturing device. The first sensor may be a heat sensing device.

The first sensor may a customer attempting to deposit one or more items into an ATM. The first sensor may record an attempted tampering with one or more components of the ATM. The first sensor may record insertion of an improper medium into the ATM. For example, the first sensor may record a jamming of an ATM dispenser or acceptor.

The apparatus may include a second sensor. The second sensor may be configured to capture second data. The second sensor may be oriented toward an identifying characteristic of an ATM customer. The second sensor may be oriented to capture an identifying characteristic of the ATM customer. The second sensor may be oriented in position that typically captures one or more identifying characteristics of a typical ATM customer.

The second sensor may be an image capturing device. The second sensor may be an iris scanner. The second sensor may be configured to detect any suitable biometric or identifying characteristic of an ATM customer.

Data recorded by a sensor may include an information stream captured by the sensor. An information stream captured by the sensor may include data recorded by the sensor.

Apparatus may include a processor device. The processor device may be configured to receive first data captured by the first sensor. The processor device may be configured to determine if the first data corresponds to a partial withdrawal of cash from the ATM. For example, the first data may be processed using one or more image or signal processing algorithms. As a further example, the processor may identify one or more segments of an information stream recorded by the first sensor. The segments of the information stream may be identified based on a time/date stamp associated with an ATM action. The time/date stamp may correspond to a time/date stamp associated with the information stream captured by the first sensor.

The processor may be configured to identify a first segment of the first data. The first segment may correspond to a collection of cash from a dispenser of the ATM. The first segment may be an image captured by the first sensor. The first segment may be a portion of a video stream captured by the first sensor. The first segment may be identified based on a start time and an end time. The start time may correspond to a dispensing of cash by the ATM. The end time may correspond to a retraction of cash by the ATM. The customer may collect cash from the ATM during a period between the start time and the end time.

The processor may be configured to identify a second segment of the first data. The second segment may correspond to cash remaining in the dispenser after a collection of cash by an ATM customer. The second segment may correspond to a collection of cash from a dispenser of the ATM. The second segment may correspond to one or more actions performed by an ATM customer. For example, the second segment may correspond to a dispensing of cash by the ATM. The second segment may be an image captured by the first sensor. The image may be identified based on a time/date stamp associated with one or more actions performed by the ATM.

Apparatus may include a fraud record generator. The fraud record generator may be configured to produce a fraud record. The fraud record generator may produce a fraud record when the first data corresponds to a partial collection of cash from an ATM. A partial collection of cash may be identified based on a retraction by the ATM.

The fraud record may include at least a portion of the first data captured by the first sensor. The fraud record may include at least a portion of the second data captured by the second sensor. The fraud record may include the first segment and the second segment captured by the first sensor. The fraud record may include one or more links to archived sensor data.

The fraud record may include one or more transaction identifiers associated with one or more actions performed by an ATM. For example, the transaction identifier may include an ATM session identifier. The ATM session may include one or more retractions or other ATM actions associated with a retraction.

The processor may be configured to determine a time window associated with the first segment and the second segment. The time window may be determined based on a time/date stamp associated with one or more actions performed by an ATM. The time window may be based on an estimated duration for completed an ATM transaction. For example, the time window may be two minutes. Two minutes may correspond to a period of time for a customer to submit a withdrawal request and collect cash dispensed in response to the request.

The processor may be configured to identify a segment of the second data captured by the second sensor during the time window. The segment of data may be identified based on a time/date stamp associated with an information stream captured by the second sensor. The fraud record may include the segment of the second data captured by the second sensor during the time window.

The segment of the data captured by the second sensor may include one or more identifying characteristics of an ATM customer. The segment of the second data may include identifying characteristics of the ATM customer captured during a time the ATM performed one or more actions. The one or more actions may have been performed on behalf of the customer. Based on a time the identifying characteristic is captured, the identifying characteristic may be associated with one or more actions of the ATM. Based on a time the identifying characteristic is captured, the identifying characteristic may be associated with one or more segments of data captured by the first sensor.

For example, a customer may enter a request for cash into an ATM at a first time. In response to the request, the ATM may dispense cash at a second time. The ATM may wait for the customer to collect the dispensed cash. At a third time, the ATM may retract any uncollected cash. The processor may identify one or more segments of sensor data associated with each of the three times. The segments may include sensor data captured before or after each of the three time periods.

A first exemplary data segment may include data captured by a first sensor prior to and following the first time. The first data segment may include an image of cash being dispensed by the ATM. A second exemplary data segment may include data captured between the first and second times. The second exemplary segment may include a collection of cash by the ATM customer. A third exemplary data segment may include data captured just prior to and following the third time. The third data segment may include an image of an amount of cash retracted by the ATM. A fourth exemplary data segment may include sensor data captured between the first time and the third time. The fourth data segment may include sensor data captured from a sensor focused on one or more identifying characteristics of the ATM customer.

The processor may be configured to identify a transaction identifier based on a time window. The transaction identifier may correspond to an action performed by the ATM during the time window. The transaction identifier may correspond to an action of the ATM performed proximate to the time window. The transaction identifier may correspond to any action associated with an account of an ATM customer.

The transaction identifier may be associated one or more actions performed by an ATM with a customer or customer account. The association between a transaction identifier and a customer may link a transaction to the customer. The customer may be associated with one or more segments of sensor data captured during a time/data associated with the transaction. Association between a customer, sensor data and transaction identifiers may be stored in a database. An association between a customer, sensor data and transaction identifiers may be included in a fraud record.

Apparatus may include a sensor. The sensor may be oriented to capture a dispensing of cash from an ATM. The sensor may be oriented to capture a retraction of cash into the ATM. The sensor may be oriented to capture action of an ATM customer in a vicinity of the ATM. The sensor may be oriented to capture action of an ATM customer in a vicinity of an ATM dispenser or acceptor.

The sensor may be moveable with respect to the ATM. Movement of the sensor may be triggered by one or more actions of an ATM customer. For example, the sensor may begin data capture in response to detection of motion within a vicinity of the ATM. The sensor may begin to capture data in response to one or more actions performed by the ATM.

The sensor may be configured to move along a track. Movement of the sensor along the track may orient the sensor with respect to the ATM. At any position along the track, the sensor may be configured to capture one or more actions performed by the ATM. At any position along the track, the sensor may be configured to capture one or more actions performed by an ATM customer. Movement of the sensor along the track may be inaudible to a customer of the ATM. The customer may be unable to discern the sensor changing positions.

When oriented in a first position, the sensor may be configured to capture a dispensing of cash from the ATM. When oriented in a second position, the sensor may be configured to capture a retraction of cash into the ATM.

For example, at any position along the track the sensor may capture a dispensing of cash from the ATM. At any position along the track, the sensor may capture an ATM customer collecting the cash dispensed by the ATM. The sensor may be moved to a position along the track according to a randomized selection of positions along the track. The randomized selection of positions along the track. Randomized movement of the sensor may thwart an intentional obstructing of the sensor.

The sensor may be repositioned during an ATM session. The sensor may be repositioned between ATM sessions. Repositioning the sensor between ATM sessions may prevent an ATM customer from detecting movement of the sensor. Repositioning the sensor between ATM sessions may prevent an ATM customer from obstructing the sensor.

Apparatus may include a first sensor. The first sensor may not capture information. The first sensor may be positioned outside the ATM. The first sensor may be visible to a customer of the ATM. The first sensor may be configured to move in response to one or more actions performed by the ATM. Movement of the first sensor may be audible to an ATM customer. For example, in response to a dispensing of cash from the ATM, the first sensor may be configured to move toward a dispenser of the ATM.

The first sensor may be configured to move in a manner that implies that the first sensor is recording actions occurring near the dispenser. The first sensor may be configured to move in manner that may motivate an unscrupulous ATM customer to attempt to obstruct the first sensor.

Apparatus may include a second sensor. The second sensor may be oriented to capture activity in the vicinity of an ATM dispenser. The second sensor may be hidden from a view of an ATM customer. The second sensor may be oriented to capture a view of the dispenser from a vantage point exposed by movement of an ATM customer to obstruct the first sensor.

Methods for detecting anomalous conduct at an automated teller machine ("ATM") are provided. Anomalous conduct may include an action performed by an ATM that is in frequently performed. Anomalous conduct may include an action performed by an ATM that may indicate an ATM malfunction. Anomalous conduct may include a retraction of uncollected cash. Anomalous conduct may include an action performed by an ATM that is associated with fraud.

The methods may include receiving an information stream from a sensor. The methods may include, in response to a retraction of cash by the ATM, identifying a segment of the information stream. The segment of the information steam may be identified based on a time associated with the retraction. The segment of the information steam may be identified based on a time associated with one or more actions performed by the ATM. The methods may include, in response to a retraction of cash by the ATM, generating a fraud record.

The fraud record may include a transaction identifier associated with one or more actions performed by the ATM. The fraud record may include a transaction identifier associated with the retraction. The fraud record may include a time window associated with the transaction identifier. The fraud record may include a segment of the information stream. The fraud record may include a link to the information stream.

The methods may include identifying a segment of the information stream based on a time window. The time window may correspond to a time beginning with a dispensing of currency. The time window may correspond to a time ending with a retracting of at least a portion of the dispensed currency. The time window may begin with an initiation of an ATM session by an ATM customer. The time window may include any suitable start time and any suitable end time.

The information stream may be captured by a sensor. The sensor may be a first sensor. The first sensor may be oriented to capture a first information stream. For example, the first sensor may be focused on a dispenser of the ATM. The sensor may capture events that occur in the vicinity of the dispenser.

An information stream captured by a sensor may include a video recording of a customer withdrawing of cash from a dispenser of the ATM. The information stream may include an image of cash remaining in the dispenser after the customer withdrawal. An image of cash remaining in the dispenser may be analyzed to determine an approximate amount of cash retracted by the ATM. The image of cash remaining in the ATM may indicate that at least some of the dispensed cash was collected by the ATM customer.

The methods may include capturing a second information stream from a second sensor. The second information stream may be captured in response to a retracting of currency by the ATM. The second sensor may be oriented to capture an identifying characteristic of an ATM customer near the ATM at a time of the retracting. The methods may include generating a fraud record that includes at least a portion of the second information stream.

The methods may include identifying a withdrawal request associated with the retraction. The withdrawal request may be submitted by an ATM customer during an ATM session. The withdrawal request may be identified based on a time window. The time window may begin at a time the ATM submits the withdrawal request. The time window may end at a time the ATM retracts currency. Based on the identified withdrawal request, a retraction may be associated with the ATM customer that submitted the request. The retraction may be associated with the ATM customer based on information provided by the ATM customer to ATM prior to the retracting. The retraction may be associated with the ATM customer based on information provided by the ATM customer to ATM after the retracting.

The methods may include receiving a mis-dispense claim. The mis-dispense claim may be received by an operator of an ATM. The mis-dispense claim may be received by an entity responsible for one or more accounts of a customer. The methods may include identifying a claimant associated with the mis-dispense claim. The claimant may be an ATM customer.

For example, a mis-dispense claim may include a claimant. The mis-dispense claim may include an account number. The account number may be associated with a claimant. The mis-dispense claim may include a time. The claimant may be associated with the mis-dispense claim based on a transaction requested or performed on behalf of the claimant proximate to the time indicated in the mis-dispense claim. The mis-dispense claim may include a location. The claimant may be associated with the mis-dispense claim based on a transaction requested or performed on behalf of the claimant at the indicated location.

The methods may include determining if the claimant is associated with a fraud record. The methods may include determining if one or more transactions conducted by the claimant are associated with a fraud record. The methods may include determining if one or more accounts of the claimant are associated with a fraud record. For example, the methods may include determining if an ATM action such as a retraction of currency is associated with one or more accounts of the claimant.

The methods may include scoring the mis-dispense claim based on the fraud record. The score may indicate a likelihood that the mis-dispense claim is associated with fraud. For example, the fraud record may include an indication that the claimant have submitted a plurality of mis-dispense claims. Submission of a plurality of mis-dispense claim may result in a higher likelihood of fraud.

In some embodiments, if a claimant is associated with a threshold number of mis-dispense claims an ATM operator may disable a retraction feature of an ATM when an ATM session is initiated by the claimant.

The fraud score may correspond to a monetary value of the mis-dispense claim. An entity may invest time and resources verifying a claim for a monetary value above a threshold value. The entity may invest less time and resources verifying a claim for a monetary value below the threshold value.

The methods may include associating a monetary value with the mis-dispense claim. The monetary value may be determined based on the scoring of the fraud record.

The fraud record further may include a transaction record. The transaction record may include a name of an ATM customer. The transaction record may include a time. The time may correspond to a request for a withdrawal of cash from the ATM. The time may correspond to a dispensing of cash from the ATM in response to the request. The time may correspond to a retraction of cash by the ATM. The transaction record may include one or more times. The times included in the transaction record may demonstrate a temporal relationship linking a withdrawal request and a retraction.

A difference between an amount of currency requested in withdrawal request and a refund amount, requested in a mis-dispense claim may be used to score the fraud record. A small or no difference between the amount requested and the refund amount may be suggestive of fraud.

Methods may include searching for information streams associated with a claimant. For example, in response to receiving a mis-dispense claim a search may be performed for information streams that may be associated with information included in the mis-dispense claim. The associated information streams may be analyzed to determine if patterns of anomalous activity are included in the information streams.

For example, the information streams may be analyzed to determine if a claimant is associated with a pattern of ATM retractions in different locations. An entity may take action in response to detection of a pattern. For example, when the claimant accesses an ATM, the entity may disable a retraction feature of the ATM.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1A:
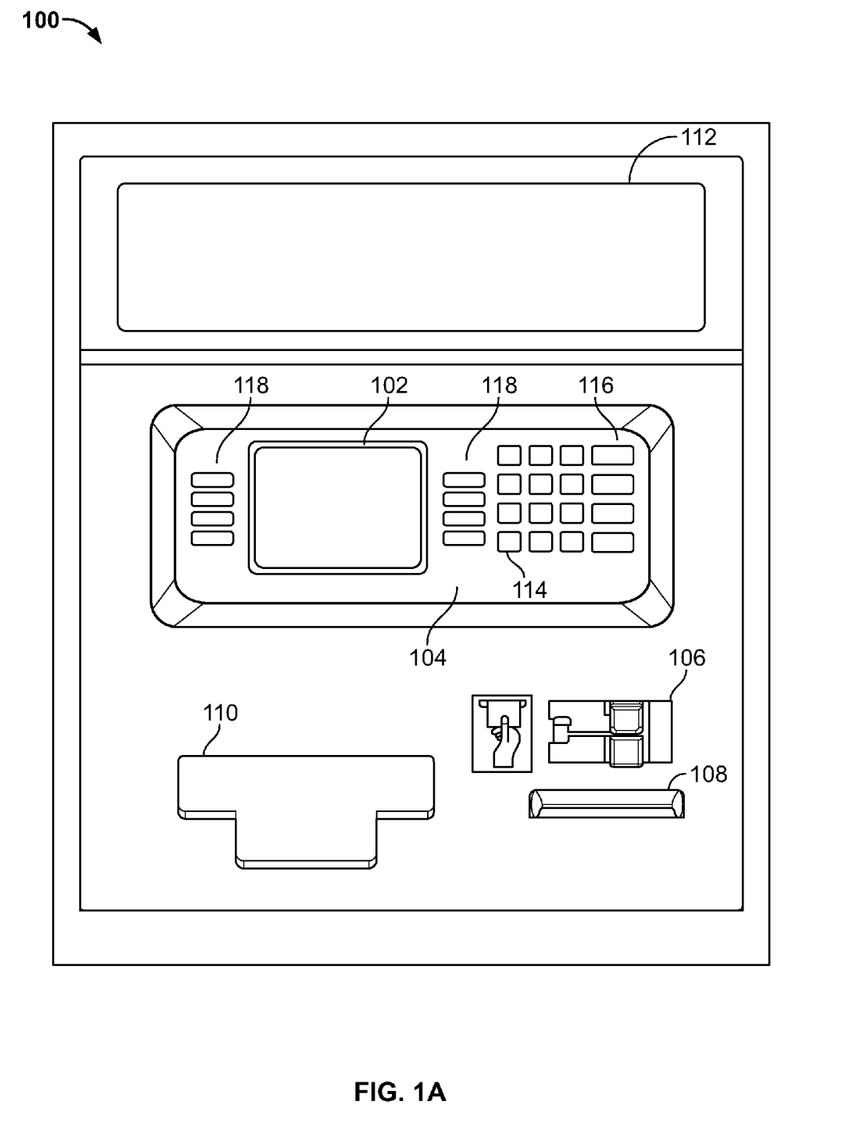
FIG. 1A shows an illustrative apparatus in accordance with principles of the invention.

FIG. 1A shows illustrative self-service device 100. Self-service device 100 may be an ATM. Self-service device 100 may include monitor 102, keypad. 104, card reader port 106, acceptor 108, item dispenser 110 and security screen 112.

Monitor 102 may exchange visual and or audio information with a customer. Keypad 104 may include alphanumeric keys 114 for the customer to enter numerical and textual data. Keypad 104 may include control keys 116. In some embodiments, control keys 116 may be used to communicate control information, such as instructions, to self-service device 100. Keypad 104 may include soft keys 118. Soft keys 118 may have functions that are dictated by programming and are presented to the customer using information that may be displayed on monitor 102.

Card reader port 106 may be the front end of any suitable card reader. The card reader may read magnetically encoded information on transaction instruments such as bank cards. In some embodiments, self-service device 100 may include a contactless chip reader, a wireless transceiver or any other suitable interface for exchanging transaction information with a transaction instrument. The transaction instrument may be a chip, an RFID tag, a smart card, a tablet, a smartphone or any other suitable device.

In some embodiments, self-service device 100 may include a biometric sensor (not shown). The biometric sensor may identify a customer based on a characteristic, such as an anatomical feature, of the customer. For example, the biometric sensor may be configured to identify the customer based on all or part of a face, a fingerprint, an iris, a retina a hand or any other suitable anatomical feature. The biometric sensor may identify the customer based on a behavioral feature such as a signature, a voice, a gait or any other suitable behavioral characteristic.

Acceptor 108 may accept any suitable tangible item. For example, acceptor 108 may accept envelopes, deposit forms, bills, checks or any other suitable documents. In some embodiments, acceptor 108 may feed into a scanner that digitizes the documents for image-based transaction processing.

Item dispenser 110 may dispense items. For example, item dispenser 110 may dispense bills. Item dispenser 110 may retract bills uncollected by a customer of device 100.

Security screen 112 may visually screen a surveillance device (not shown). The surveillance device may provide video information about individuals that are present near the self-service device and the conditions there. The surveillance device may detect a presence of motion in a vicinity of device 100.

Figure 1B:
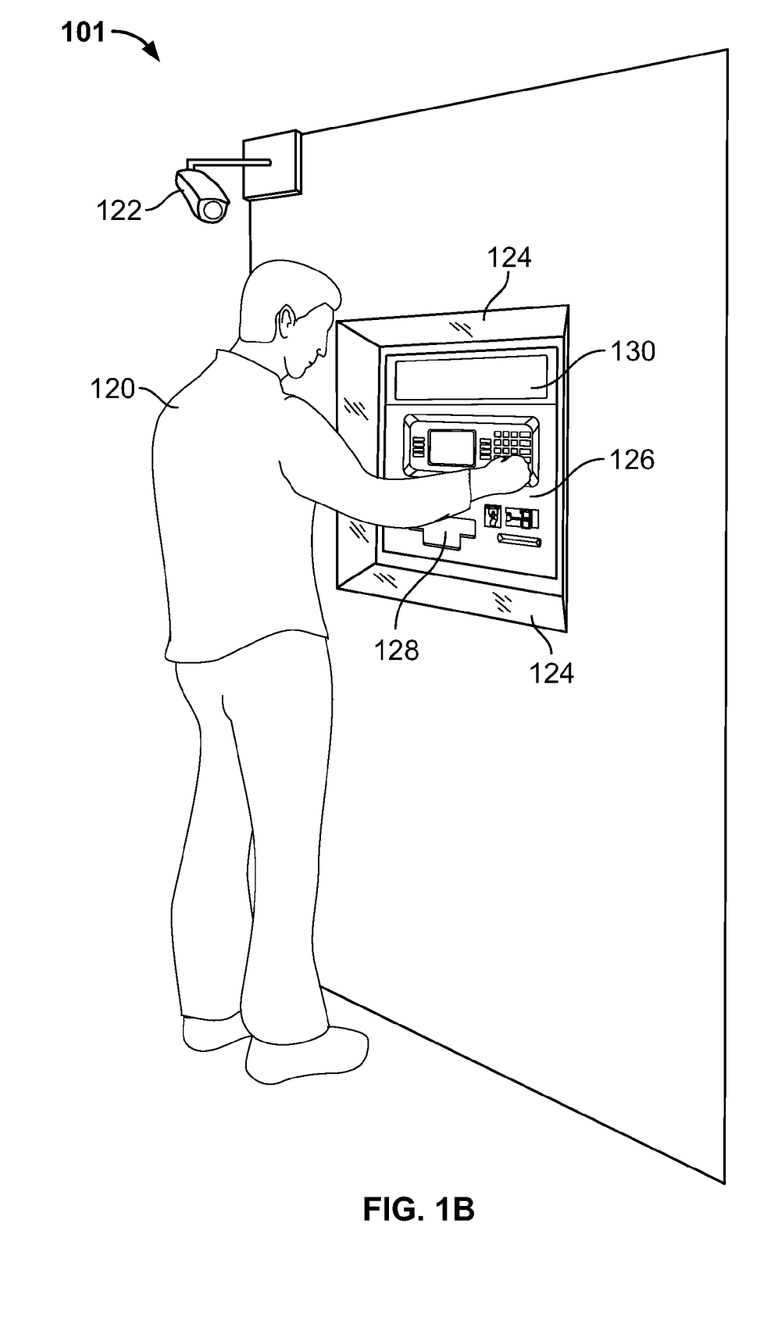
FIG. 1B shows an illustrative scenario in accordance with principles of the invention.

FIG. 1B shows illustrative scenario 101. Scenario 101 shows ATM customer 120 accessing ATM 126. ATM 126 may include one or more features of device 100 (shown in FIG. 1A). Customer 120 may request a withdrawal of cash from ATM 126. The requested cash may be dispensed to customer 120 via dispenser 128.

Sensor 122 may be oriented to capture one or more actions of customer 120. For example, sensor 122 may capture a collecting of cash dispensed via dispenser 128.

ATM 126 may include a sensor (not shown) behind screen 130. The sensor behind screen 130 may be oriented to capture one or more characteristics of customer 120. For example, the sensor may capture a biometric feature, such as an iris pattern of customer 120.

One or more actions of customer 120 may be captured by a sensor positioned behind panels 124. Sensor 122 may be configured to move and attract the attention of customer 120. Movement of customer 120 to obstruct sensor 122 may allow the sensor behind panels 124 to capture one or more actions of customer 120.

The sensor behind panels 124 may be oriented to capture customer 120 collecting cash from dispenser 128. The sensor behind screen 124 may be oriented to capture uncollected cash in dispenser 128. The sensor behind screen 124 may be oriented to capture a retracting of uncollected cash in dispenser 128. The sensor behind panels 124 may be oriented to capture customer 120 inserting one or more items into acceptor 140.

Figure 1C:
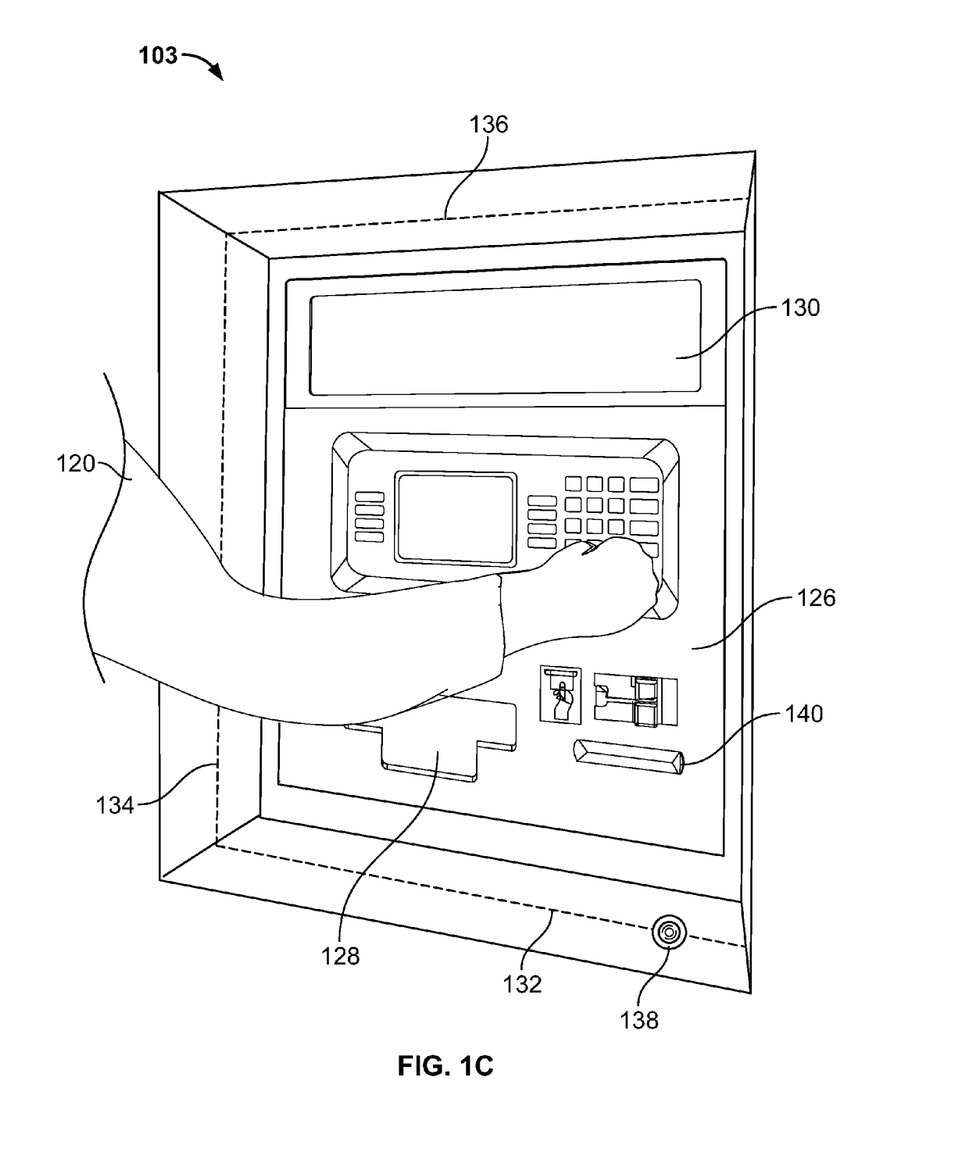
FIG. 1C shows an illustrative apparatus in accordance with principles of the invention.

FIG. 1C shows illustrative apparatus 103. Apparatus 103 may include one or more features on device 100 (shown in FIG. 1A). Apparatus 103 may include one or more features on device 126 (shown in FIG. 1B).

Apparatus 103 shows ATM 126 without panels 124. Removing panels 124 exposes sensor 138. Removal of panels 124 exposes track segments 132, 134 and 136. Sensor 138 may be configured to move along track segments 132, 134 and 136. Sensor 138 may be configured to move bi-directionally along 132, 134 and 136.

In a position along track segments 132, 134 and 136, sensor 138 may be configured to zoom, pan, tilt, truck, dolly, follow, pedestal or otherwise orient itself in any suitable position with respect to a target. Sensor 138 may be configured to move based on heat associated with customer 120. For example, sensor 138 may move to a position along track segments 132, 134 and 136 that is a distance from heat emitted by customer 120. The distance may be configured to avoid customer 120 obstructing sensor 138.

Sensor 138 may be oriented along track segments 132, 134 and 136 based on a randomized positioning algorithm. Randomized positioning of sensor 138 along track segments 132, 134 and 136 may minimize an intentional obstruction of sensor 138.

Figure 2:
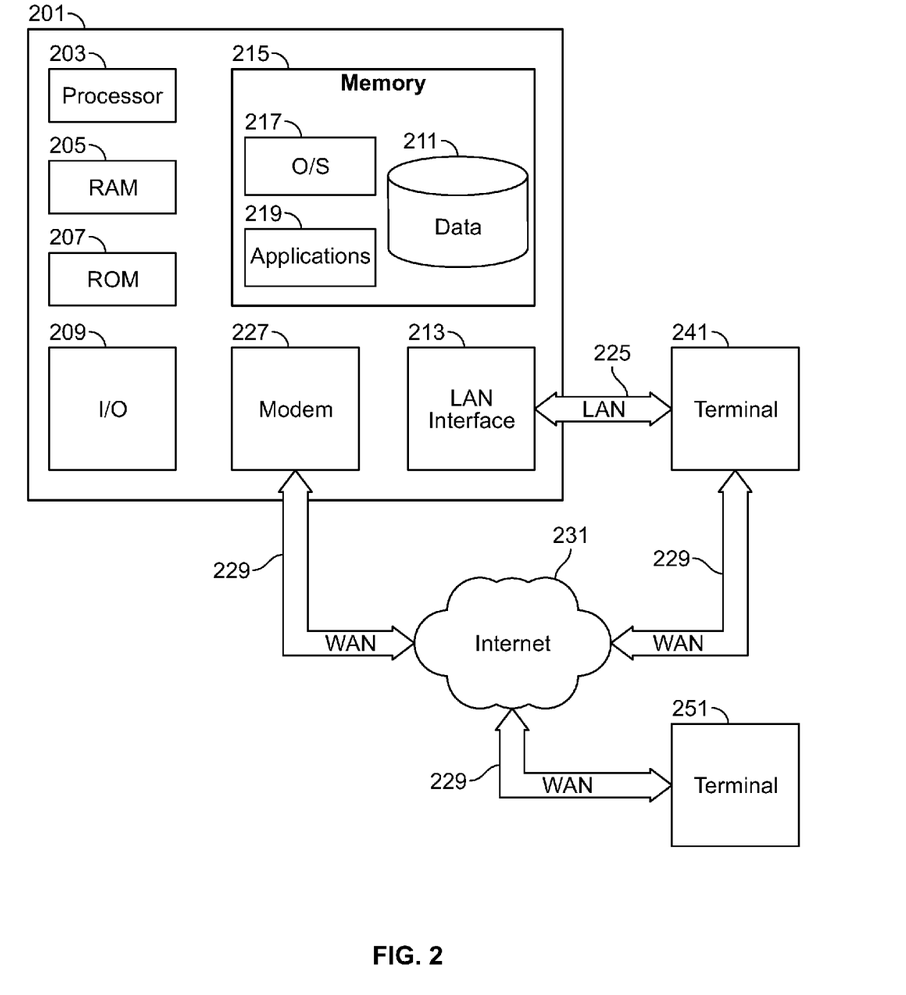
FIG. 2 shows an illustrative apparatus in accordance with principles of the invention.

FIG. 2 is a block diagram that illustrates a generic computing device 201 (alternatively referred to herein as a "server") that may be used according to an illustrative embodiment of the invention. The computer server 201 may have a processor 203 for controlling overall operation of the server and its associated components, including RAM 205, ROM 207, input/output module 209, and memory 215.

Input/output ("I/O") module 209 may include a microphone, keypad, touch screen, and/or stylus through which a user of device 201 may provide input, and may also include one or more of a speaker for providing audio output and a video display device for providing textual, audiovisual and/or graphical output. Software may be stored within memory 215 and/or storage to provide instructions to processor 203 for enabling server 201 to perform various functions. For example, memory 215 may store software used by server 201, such as an operating system. 217, application programs 219, and an associated database 211. Alternatively, some or all of server 201 computer executable instructions may be embodied in hardware or firmware (not shown).

Server 201 may operate in a networked environment supporting connections to one or more remote computers, such as terminals 241 and 251. Terminals 241 and 251 may be personal computers or servers that include many or all of the elements described above relative to server 201. The network connections depicted in FIG. 2 include a local area network (LAN) 225 and a wide area network (WAN) 229, but may also include other networks. When used in a LAN networking environment, computer 201 is connected to LAN 225 through a network interface or adapter 213. When used in a WAN networking environment, server 201 may include a modem 227 or other means for establishing communications over WAN 229, such as Internet 231.

It will be appreciated that the network connections shown are illustrative and other means of establishing a communication link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 219, which may be used by server 201, may include computer executable instructions for invoking user functionality related to communication, such as email, short message service (SMS), and voice input and speech recognition applications.

Computing device 201 and/or terminals 241 or 251 may also be mobile terminals including various other components, such as a battery, speaker, and antennas (not shown).

Terminal 251 and/or terminal 241 may be portable devices such as a laptop, tablet, smartphone or any other suitable device for storing, transmitting and/or transporting relevant information.

Any information described above in connection with database 211, and any other suitable information, may be stored in memory 215. One or more of applications 219 may include one or more algorithms that may be used to record sensor data, process information data streams obtained from sensors, position sensors or any suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, mobile phones, tablets and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 3:
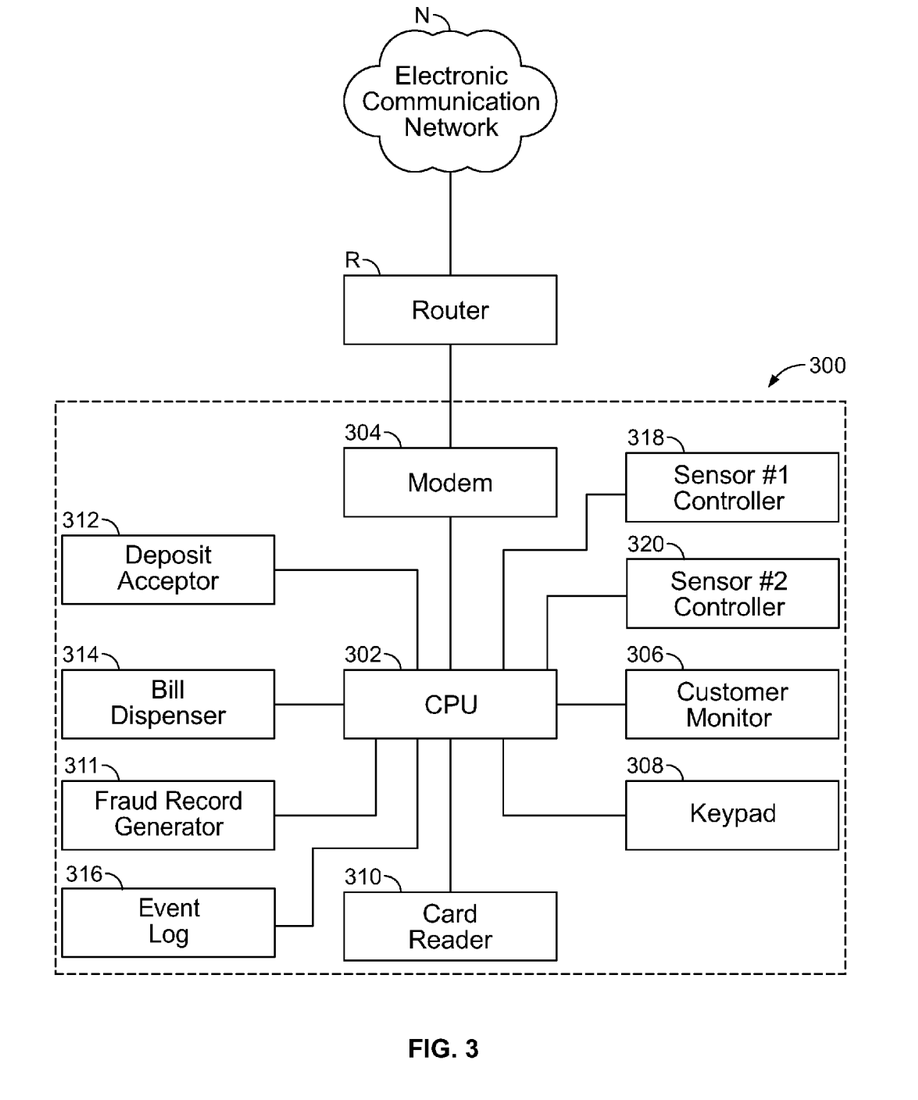
FIG. 3 shows an illustrative apparatus in accordance with principles of the invention.

FIG. 3 shows illustrative apparatus 300. Apparatus 300 may include a control system for controlling a self-service kiosk ("SSK") such as an ATM, device 100 (shown in FIG. 1A) or apparatus 126 (shown in FIG. 1B).

Apparatus 300 is controlled by CPU 302. CPU 302 may include one or more features of server 201 (shown in FIG. 2). CPU 302 exchanges transaction information with electronic communication network N via modem 304, which is in communication with router R.

CPU 302 may receive transaction information from a customer via monitor 306, keypad 308, card reader 310, deposit acceptor 312 or bill dispenser 314.

CPU 302 may direct the SSK to dispense bills through bill dispenser 314. CPU 302 may transmit information to bill dispenser 314 directing bill dispenser 314 to retract any currency remaining in bill dispenser 314 after expiration of a time out period.

CPU 302 may receive information from sensor controllers 318 and 320. Sensor controllers 318 may control one or more sensors. Sensor controller 320 may control one or more sensors. Sensor controller 318 may process an information stream captured by a first sensor to CPU 302. Sensor controller 320 may process an information stream captured by a second sensor to CPU 302.

CPU 302 may transmit information to sensor controllers 318 and 320. For example, CPU 302 may instruct sensor controller 318 to adjust an orientation of a first sensor (not shown). CPU 302 may instruct sensor controller 320 to adjust an orientation of a second sensor (not shown). CPU 302 may direct a transmission of information processed by controllers 318 and 320 onto electronic network N via modem 304 and router R.

CPU 302 may direct sensor controllers 318 and 320 to capture activity in a vicinity of dispenser 314. For example, controller 318 may position a first sensor to capture a dispensing or retracting of cash by dispenser 314. CPU 302 may direct sensor controllers 318 and 320 to start or stop capturing information.

CPU 302 may receive a request to deposit a tangible item. CPU 302 may transmit information to bill acceptor 312 directing bill acceptor 312 to accept one or more tangible items inserted into bill acceptor 312. A deposited tangible item may be stored in purge-bin or a depository (not shown). In response to receiving a deposit request, controller 318 may position a sensor to capture the inserting of a tangible item into acceptor 312.

Apparatus 300 includes event log 316. Event log 316 may record one or more actions directed by CPU 302. For example, event log 316 may record a dispensing or retracting of cash by dispenser 314. Event log 316 may record an adjustment of a sensor position. Sensor controllers 318 and 320 may adjust a sensor position based on information recorded in event log 316.

Apparatus 300 includes fraud record generator 311. CPU 302 may direct fraud record generator to produce a fraud record (not shown). Data from sensor controllers 318 or 320 may be transmitted to fraud record generator 311. Fraud record generator 311 may obtain data recorded in event log 316. Fraud record generator 311 may obtain data from a remote source, such as network N. Fraud record generator 311 may transmit data obtained from components of apparatus 300 onto network N.

Fraud record generator 311 may transmit a lookup request to event log 316. Event log 316 may include a database, such as database 211 (shown in FIG. 2). Event log 316 may store records of action performed by a SSK. The records may include a time/date stamp, account numbers, method of access or any suitable information generated by a SSK such as an ATM.

Fraud record generator 311 may submit a query to event log 316 requesting one or more records of actions taken a SSK during a time window. The time window may include a first period prior to a dispensing of cash and a second period of time following the dispensing of cash. The fraud record generator 311 may include results of the query in the fraud record. The fraud record may list one or more accounts associated with the actions of the SSK.

For example, an ATM customer may access an ATM by entering authentication credentials such as swiping a card or entering a PIN number. Based on the presented credentials, the ATM may determine one or more bank accounts associated with the customer. The ATM may allow the customer to conduct one or more transactions based on a balance of funds in the one or more bank accounts. Each of the transaction conducted by the customer may be included in a fraud record produced by fraud record generator 311.

In some embodiments, fraud record generator 311 may generate a fraud record in response to a specific action taken by a SK. For example a fraud record may be generated in response to a request for a withdrawal of funds, a retraction of cash or a deposit of a tangible item. A fraud record may be generated in response to a change in orientation of one or more sensors controlled by sensor controllers 318 and 320. In some embodiments, fraud record generator 311 may generate a fraud record in response to a request received via network N.

Figure 4A:
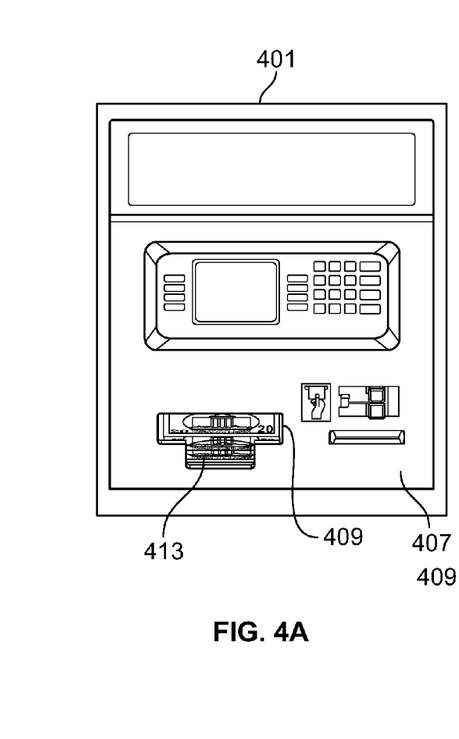
FIGS. 4A-4C show illustrative scenarios in accordance with principles of the invention.
Figure 4B:
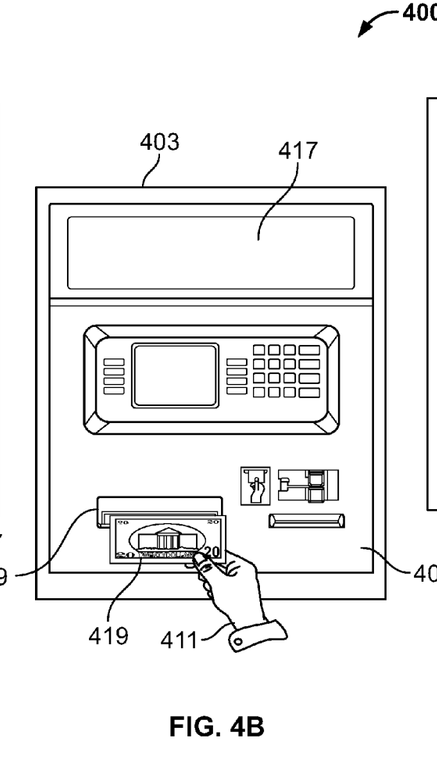
Figure 4C:
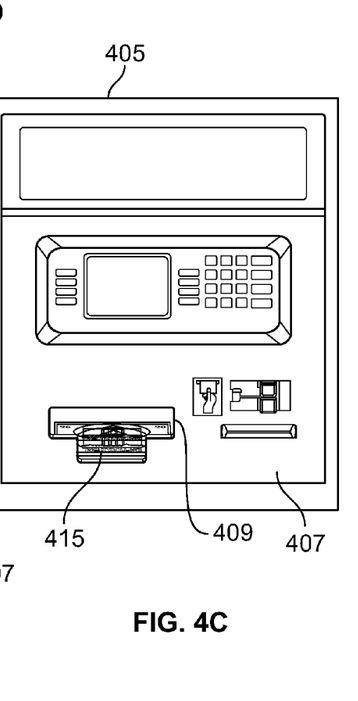

FIGS. 4A-4C show illustrative scenario 400. Scenario 400 may be captured by one or more sensors.

Scenario 400 includes image 401. Image 401 may be captured by a sensor positioned in or near ATM 407. The sensor may be controlled by a sensor controller such as sensor controller 318 or 320 (shown in FIG. 3).

Image 401 shows a dispensing of cash 413 by ATM 407. ATM 407 may include one or more features of device 100 (shown in FIG. 1A) or apparatus 126 (shown in FIG. 1B). Cash 413 is dispensed by dispenser 409.

Image 403 shows ATM customer 411—collecting cash 419 from dispenser 409. Image 403 may be captured by one or more sensors (not shown) positioned in or near ATM 407. The one or more sensors may be oriented to capture image 403. Image 403 may be parsed from an informational stream captured by the one or more sensors. An estimated amount of cash 419 collected by customer 411 may be determined based on image 403.

When customer 411 collects cash 419, a sensor hidden by screen 417 may capture a personal characteristic of customer 411. The personal characteristic may identify customer 411. The personal characteristic may be a biometric feature of customer 411. The sensor behind screen 417 may be positioned in response to a dispensing of cash 413 (shown in image 401).

Image 405 shows that cash 415 remains uncollected in dispenser 409. Image 405 shows that the amount of remaining cash 415 is less than the amount of dispensed cash 413. A difference in value between dispensed cash 413 and uncollected cash 415 may provide an estimate of how much cash 419 was collected by customer 411. After expiration of a time-out period, cash 415 may be retracted into ATM 407.

Figure 5:
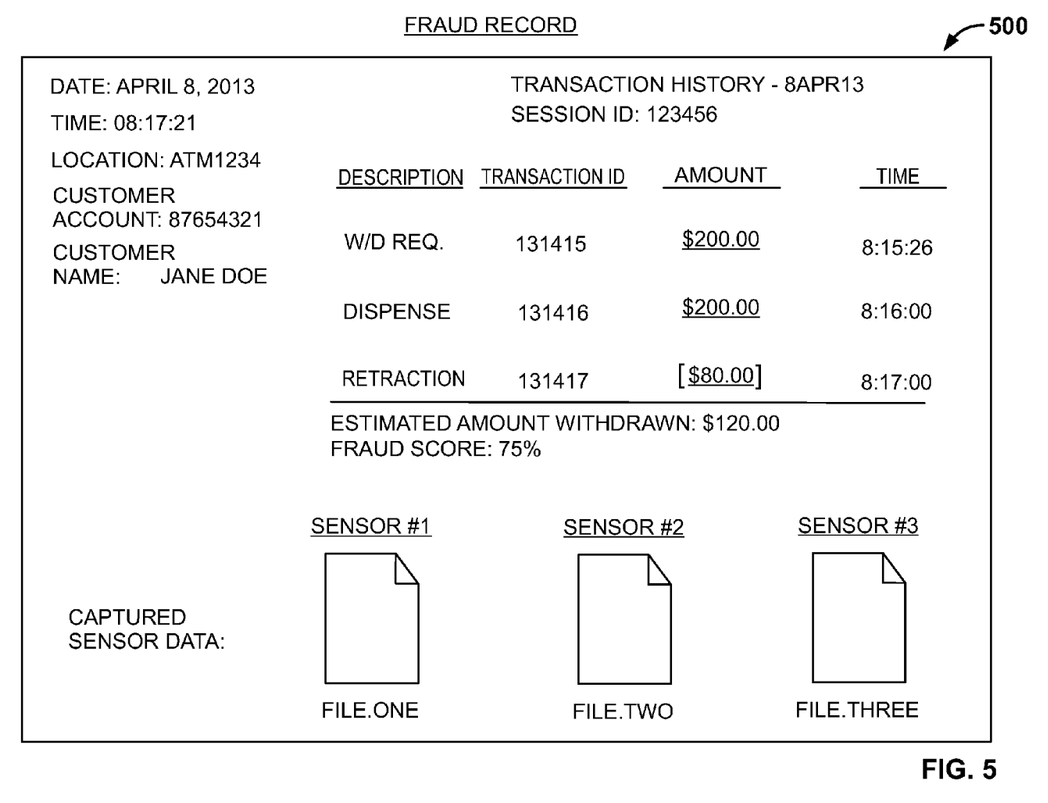
FIG. 5 shows illustrative information in accordance with principles of the invention.

FIG. 5 shows illustrative fraud record 500. Fraud record 500 includes transaction detail associated with an ATM session. Fraud record 500 may list one or more transactions conducted during the ATM session. Fraud record 500 may include transaction details recorded in event log 316 (shown in FIG. 3).

Fraud record 500 includes an estimated amount of retracted cash. The estimate is enclosed in brackets. The estimate may be determined based on one or more information streams captured by one or more sensors. The estimate may be determined based on one or more images such as image 401, 403 and 405 (shown in FIG. 4). An information stream captured by a sensor may be processed by a server such as server 201 (shown in FIG. 2). Processing by server 201 may provide a computer based estimate of retracted cash.

Fraud record 500 includes information streams captured by sensor one, sensor two and sensor three. Fraud record. 500 includes a fraud score. The fraud score may reflect a likelihood that one or more transactions included in a fraud record are associated with fraud. Based on fraud record 500, an entity may be prepared to address mis-dispense claims alleged to have occurred during an ATM session.

Figure 6:
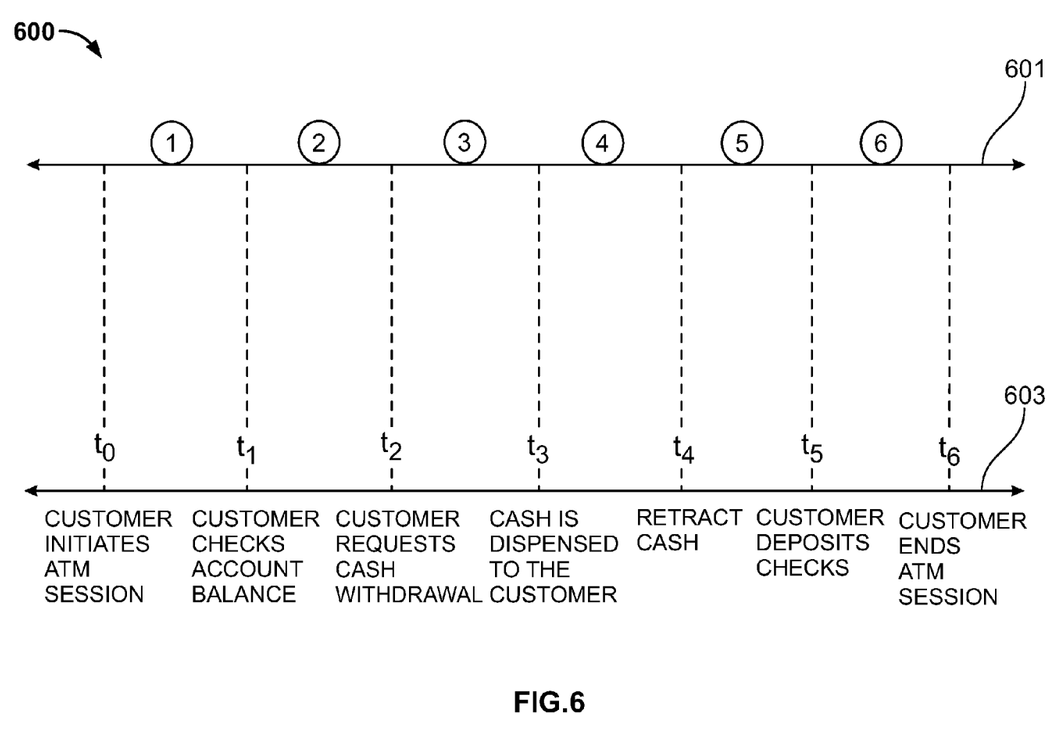
FIG. 6 shows illustrative information in accordance with principles of the invention.

FIG. 6 shows illustrative information 600. Information 600 includes timelines 601 and 603.

Timeline 603 shows illustrative actions performed by an ATM, such as device 100 (shown in FIG. 1A). At t0, a customer initiates an ATM session. The ATM session may be initiated by the customer presenting credentials to the ATM. The credentials may include swiping an issued bank card and entering a PIN number. At t1, the customer checks a balance of funds held in an account. At t2, the customer requests a withdrawal of cash from the account. At t3, the ATM dispenses cash to the customer. The cash may be dispensed from a dispenser such as dispenser 110 (shown in FIG. 1A).

At t4, any cash uncollected by the customer is retracted by the ATM. At t5, the customer initiates a deposit of checks. The checks may be inserted into an acceptor such as acceptor 108 (shown in FIG. 1A). At t6, the customer ends the ATM session that began at t0.

Timeline 601 shows information segments 1-6 that may be captured by one or more sensors associated with an ATM, such as ATM 126 (shown in FIG. B). Information segments 1-6 may be part of an information stream captured by one or more sensors. At t0, a sensor may begin capturing data. Based on a start time of t0 and an end time of t1, informational segment 1 may be identified. Information segment 1 may include images of the customer initiating the ATM session. Information segment 2 may include action of the customer/ATM that occurred between t1 and t2. Information segment 3 may include action of the customer/ATM that occurred between t2 and t3.

Information segment 4 may include action of the customer/ATM that occurred between t3 and t4. A time window between t3 and t4 may correspond to a time-out period. Information segment 4 may include images showing the customer collecting dispensed cash. Information segment 4 may be included in a fraud record such as fraud record 500 (shown in FIG. 5). An information segment may be identified based on ATM actions recorded in a log such as event log 316 (shown in FIG. 3). For example, a sensor may begin capturing data at t2. The sensor may continue to capture data until a time following t4.

In some embodiments, a sensor may be configured to capture an identifying characteristic of the customer. The sensor may capture the identifying characteristics during a time window between t0 and t6. In some embodiments, the sensor may capture the identifying characteristic in response to one or more actions of the ATM. For example, the second sensor may record the characteristic in response to the ATM receiving a request for a withdrawal at t2.

In some embodiments, sensors may continually capture data. Continuous data capture may increase a likelihood that an unobstructed image of a customer action or characteristic may be captured.

Figure 7:
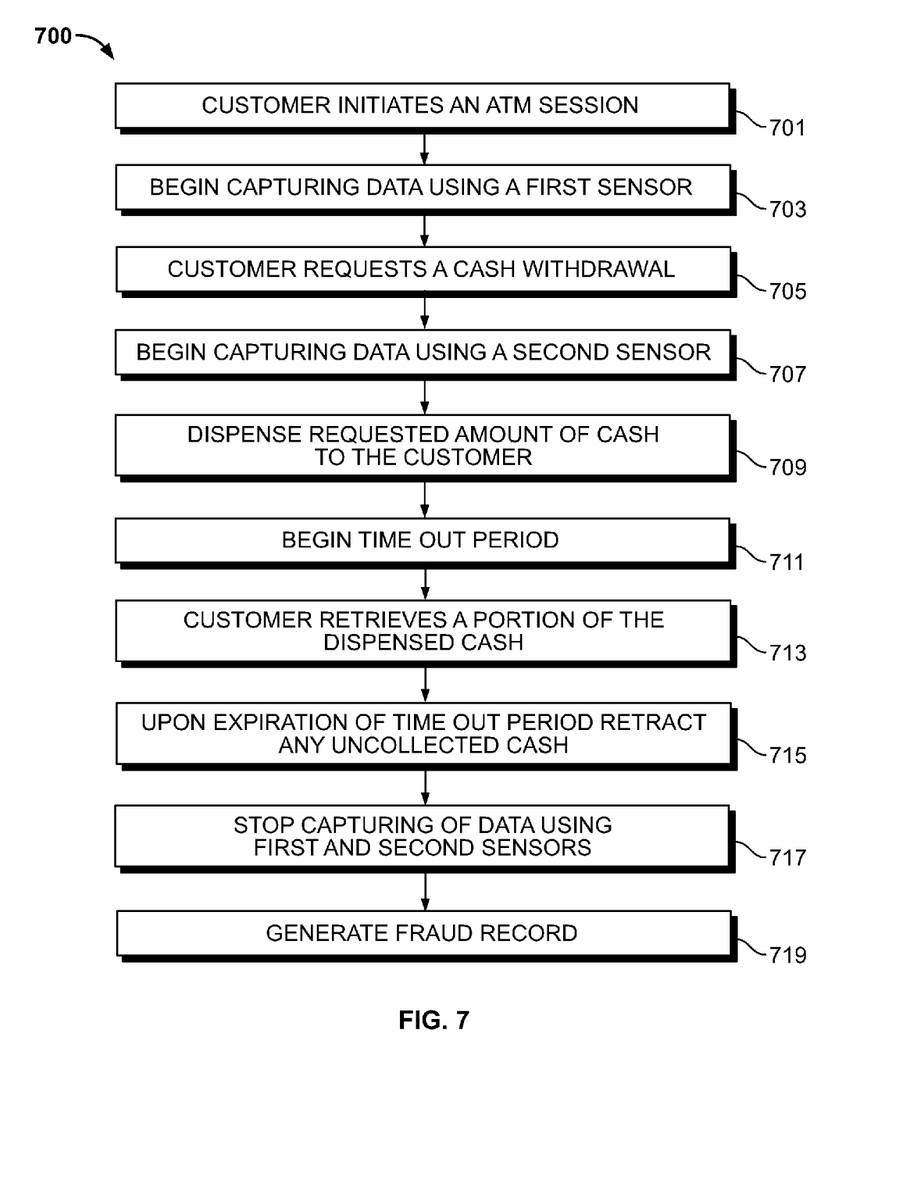
FIG. 7 shows an illustrative process in accordance with principles of the invention.

FIG. 7 shows illustrative process 700. For the sake of illustration, the steps of the process illustrated in FIG. 7 will be described as being performed by a "system." The "system" may include one or more of the features of the apparatus and information shown in FIGS. 1-6 and/or any other suitable device or approach. The "system" may be provided by an entity. The entity may be an individual, an organization or any other suitable entity.

At step 701, the system detects that a customer has initiated an ATM session. At step 703, the system instructs a first sensor to begin capturing data. The captured data may form an information stream. The captured data may include one or more actions of the customer.

At step 705, the system receives a customer request for a cash withdrawal. At step 707, the system instructs a second sensor to begin capturing data. The data captured by the second sensor may include an identifying characteristic of the customer. The data captured by the second sensor may include one or more actions of the customer. The second sensor may be positioned differently from the first sensor. The identifying characteristic may be captured by repositioning the first sensor.

At step 709, the system dispenses the requested amount of cash to the customer. At step 711, the system begins a time-out period. The time-out period may provide time for the customer to collect the dispensed cash. At step 713, the customer retrieves a portion of the dispensed cash.

At step 715, upon expiration of the time-out period, the system retracts any uncollected cash. At step 717, in response to retraction of the uncollected cash, the system instructs the first and second sensors cease capturing data. At step 719, the system generates a fraud record. The fraud record may include data captured by the first and second sensors. The fraud record may include a link to the data captured by the first and second sensors.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for detection of partial retrieval of dispensed currency at an automated teller machine have been provided. Persons skilled in the art will appreciate that the present invention can be practiced by other than the described embodiments, which are presented for purposes of illustration rather than of limitation. The present invention is limited only by the claims that follow.

What is claimed is:

1. An apparatus for detecting a partial retrieval of currency dispensed from an automated teller machine ("ATM"), the apparatus comprising:
    a decoy sensor positioned outside a housing of the ATM and configured to move in a manner that implies that the decoy sensor is recording actions of an ATM customer proximate to a dispenser of the ATM;
    a four-sided track positioned inside the housing of the ATM;
    a second sensor moveable along the four-sided track such that the second sensor is focused on a portion of the dispenser that is exposed by expected movement of the ATM customer in response to movement of the decoy sensor and wherein the second sensor is configured to capture first data showing:
        cash dispensed from the dispenser and awaiting retrieval by the ATM customer;
        the ATM customer retrieving a first portion of the dispensed cash; and
        a second portion of the dispensed cash being retracted into the ATM by the dispenser;
    a third sensor oriented toward an identifying characteristic of the ATM customer and configured to capture second data comprising the identifying characteristic of the ATM customer during a time the second sensor is capturing the first data; and
    a computer system comprising:
        a non-transitory computer readable medium having computer readable program code embodied therein; and
        a processor configured to execute the computer readable program code; and
        the computer readable program code in said computer system when executed by the processor causes the computer system to:
            determine if the first data corresponds to a partial withdrawal of cash from the ATM; and
            produce a fraud record when the first data corresponds to the partial withdrawal, the fraud record comprising:

at least a portion of:
the first data captured by the second sensor; and
the second data captured by the third sensor; and
a transaction identifier associated with the partial withdrawal.

2. The apparatus of claim 1 wherein the second sensor comprises an image capturing device.

3. The apparatus of claim 1 wherein the third sensor comprises an image capturing device.

4. The apparatus of claim 1 wherein the computer readable program code in said computer system when executed by the processor causes the computer system to identify:
a first segment of the first data corresponding to a withdrawal of cash from the dispenser of the ATM; and
a second segment of the first data corresponding to cash remaining in the dispenser after the withdrawal.

5. The apparatus of claim 4 wherein the fraud record comprises the first segment and the second segment.

6. The apparatus of claim 4, the computer readable program code in said computer system when executed by the processor causes the computer system to:
determine a time window associated with the first segment and the second segment; and
identify a segment of the second data captured during the time window.

7. The apparatus of claim 6 wherein the fraud record comprises the segment of the second data.

8. The apparatus of claim 6 wherein the computer readable program code in said computer system when executed by the processor causes the computer system to identify the transaction identifier based on the time window.

9. A method for reducing fraud at an automated teller machine ("ATM"), the method comprising:
moving a decoy sensor positioned outside a housing of the ATM in a manner that implies that the decoy sensor is recording actions of an ATM customer proximate to a dispenser of the ATM;
moving a second sensor along a track that surrounds a dispenser of the ATM, wherein the track is positioned inside the housing of the ATM;
focusing the second sensor on a portion of the dispenser that is visible to the ATM customer and exposed by the ATM customer in response to movement of the decoy sensor;
capturing an information stream using the second sensor focused on the portion of the ATM dispenser, the information stream showing:
the ATM customer collecting at least a first portion of the cash presented by the dispenser;
before the ATM dispenser retracts at least a second portion of the cash, the second portion of the cash remaining available for collection by the customer; and
the ATM dispenser retracting the second portion of the presented cash; and
in response to the ATM dispenser retracting the second portion of the cash, using a computer system to generate a fraud record, the fraud record comprising:
a transaction identifier associated with the retraction;
a time window associated with the transaction identifier; and
the information stream.

10. The method of claim 9, further comprising using the computer system to identify the information stream based on the time window.

11. The method of claim 9 wherein, when the information stream is a first information stream, the method further comprises, in response to the retracting, capturing a second information stream using the decoy sensor.

12. The method of claim 9 wherein, when the information stream is a first information stream, the method further comprises, in response to the retracting, capturing a second information stream using a third sensor.

13. The method of claim 12 wherein:
the second information stream comprises a characteristic of the ATM customer captured by the third sensor; and
the fraud record comprises at least a portion of the second information stream.

14. The method of claim 10, further comprising using the computer system to:
based on the time window, identify a withdrawal request associated with the retracting;
based on the withdrawal request, identify the ATM customer; and
associate the ATM customer with the retracting.

15. The method of claim 9 further comprising using the computer system to:
receive a mis-dispense claim;
identify a claimant associated with the mis-dispense claim;
determine if the claimant is associated with the fraud record; and
score the claim based on the fraud record.

16. The method of claim 15, further comprising using the computer system to:
determine a monetary value based on the scoring of the fraud record; and
associate the monetary value with the mis-dispense claim.

17. The method of claim 9 wherein the fraud record further comprises:
a transaction record comprising:
a name of the ATM customer;
a first time corresponding to a request for a withdrawal from the ATM;
a second time corresponding to a dispensing of the cash from the ATM in response to the request; and
a third time corresponding to the retracting of the second portion of the cash.

18. The method of claim 9 wherein the information stream comprises:
a video recording of a withdrawal of cash from the dispenser of the ATM; and
an image of cash remaining in the dispenser after the withdrawal.

19. An apparatus for detecting a partial retrieval of cash from an automated teller machine ("ATM"), the apparatus comprising:
a decoy sensor positioned outside a housing of the ATM, the decoy sensor configured to move in a manner that implies that the decoy sensor is recording actions of an ATM customer proximate to a dispenser of the ATM;
a track that surrounds a dispenser of the ATM;
a second sensor moveable along the track such that the sensor is oriented to capture:
a portion of an ATM dispenser that is:
visible to the ATM customer; and
expected to be unobstructed based on anticipated movement of the ATM customer in response to movement of the decoy sensor;
a dispensing of cash from the ATM dispenser;
cash remaining in the ATM dispenser after the dispensing; and a retracting of the cash remaining in the ATM dispenser back into the ATM;

wherein the decoy sensor does not capture information.

20. The apparatus of claim 19 wherein, the second sensor is configured to capture:

the dispensing in a first position along the track; and the retracting in a second position along the track.

21. The apparatus of claim 19 wherein the second sensor is configured to:

identify an expected position of the ATM customer based on movement of the decoy sensor;

determine a capture position along the track that is expected to be unobstructed by the customer based on the expected position; and capture the retracting oriented in the capture position.

* * * * *